Aug. 12, 1924. 1,504,692
G. F. KNOX
EXPANSION VALVE FOR REFRIGERATING SYSTEMS
Filed March 16, 1922
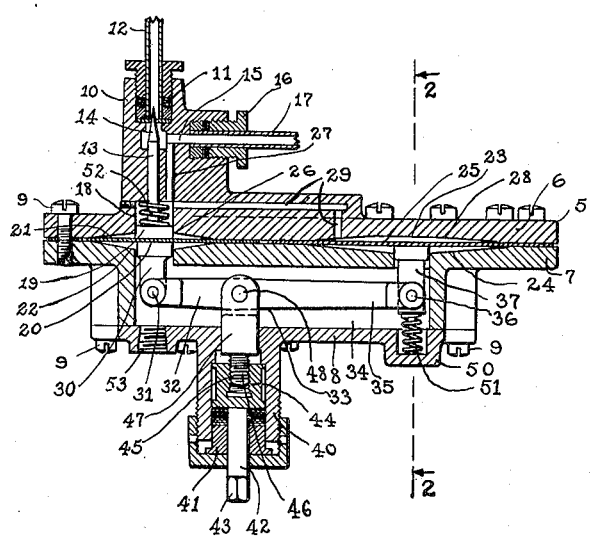
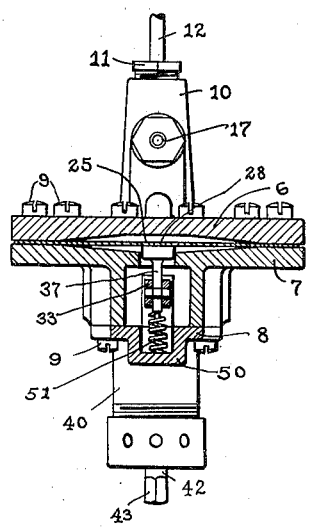
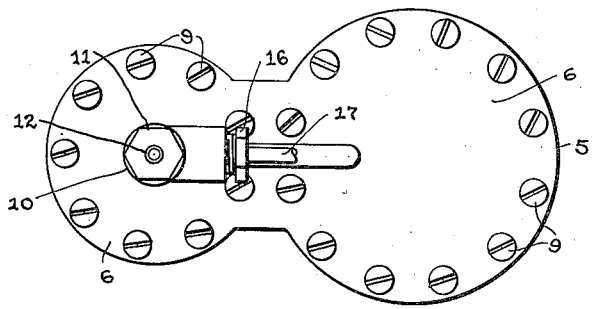
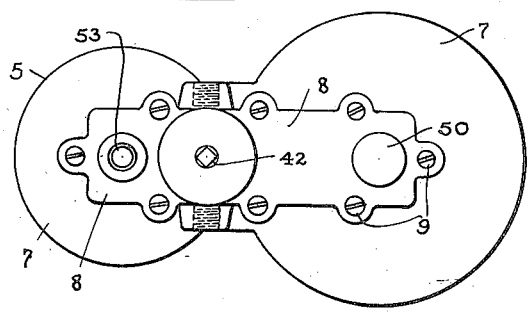
INVENTOR.
George F. Knox,
BY Morsell + Keeney
ATTORNEYS.

Patented Aug. 12, 1924.                                              1,504,692

UNITED STATES PATENT OFFICE.

GEORGE F. KNOX, OF MILWAUKEE, WISCONSIN.

EXPANSION VALVE FOR REFRIGERATING SYSTEMS.

Application filed March 16, 1922.  Serial No. 544,260.

*To all whom it may concern:*

Be it known that I, GEORGE F. KNOX, a citizen of the United States, and resident of Milwaukee, in the county of Milwaukee and State of Wisconsin, have invented new and useful Improvements in Expansion Valves for Refrigerating Systems, of which the following is a description, reference being had to the accompanying drawings, which are a part of this specification.

This invention relates to improvements in expansion valves for refrigerating systems and has for one of its objects to provide a means for controlling the flow of ammonia gas, or other refrigerating fluid, passing through the said controlling means.

A further object to the invention is to provide a valve for controlling the refrigerating fluid which will be simple in construction, comparatively inexpensive to make, and entirely automatic in its action when in use.

A still further object of the invention is to provide a balanced valve which is included in the circuit of the refrigerating fluid and which will automatically control the pressure of the said fluid emerging therefrom to maintain the same substantially constant regardless of fluctuations in the supply pressure.

A still further object of the invention is to provide a valve of the character described, provided with a pair of flexible diaphragms, suitably connected by a lever mechanism whereby the above desirable results may be obtained.

With these and other objects in view, which will appear as the description proceeds, the invention consists in the novel details of construction and combinations of parts more fully disclosed below and particularly pointed out in the appended claims.

Referring to the accompanying drawings in which like reference characters designate like parts in all the views:

Figure 1 is a central vertical sectional view of a valve made in accordance with the present invention;

Fig. 2 is a transverse vertical sectional view of the parts shown in Fig. 1, taken approximately on the line 2—2 of the said figure looking in the direction of the arrows;

Fig. 3 is a top plan view of the parts shown in Fig. 1 and;

Fig. 4 is an inverted plan view of the parts shown in Fig. 1.

Referring to the drawings, the numeral 5 designates the body or casing of the valve which is preferably composed of three sections 6, 7, and 8, which may be secured together in any suitable manner as by the bolts or screws, 9 illustrated.

The uppermost section 6 of the casing is provided with a boss or extension 10 having a stuffing box 11 through which passes the inlet pipe 12, leading from any suitable source of refrigerating fluid supply not shown. The said boss 10 is further bored to accommodate the stem 13 of a needle valve 14 which co-acts with the lower end of the inlet pipe 12 to control the passage of ammonia gas or other refrigerating fluid therefrom. The said boss 10 is also provided with the horizontal passage 15, leading through a stuffing box 16 to the discharge or outlet pipe 17 as will be clear from Fig. 1.

The casing member 6 is provided with an enlarged bore or chamber 18, in axial alinement with the bore in the boss 10 which accommodates the valve stem 13, which chamber is adapted to receive and accommodate the head 19, rigid with the said valve stem. The said head 19 is suitably connected in any desired manner to the approximate center of the diaphragm 20, the edges of which are clamped rigidly between the companion surfaces of members 6 and 7 as will be readily apparent. The said members 6 and 7 are cut away as at 21, and 22 respectively to provide a pressure chamber in which the said diaphragm 20 is adapted to move as will appear more fully below.

The said members 6 and 7 are further cut away as at 23 and 24 respectively to provide a second pressure chamber in which a diaphragm 25, similar to the diaphragm 20, is adapted to operate. The ammonia gas or other refrigerating fluid is introduced into the chamber 26 by means of a duct or passage 27, leading from the passage 15 to the enlarged bore 18, as will be readily apparent, while the said gas is introduced into the chamber 28 by means of a duct or passage 29, leading from the said chamber 18.

Connected to the lower side of the diaphragm 20 in axial alinement with the head 22, is a link 30, pivotally connected as at 31, to one arm 32 of a lever 33 carried within a recess 34, with which the member 7 is provided. The other arm 35, of the said lever 33 is pivotally connected as at 36 to one end of a link, 37, the other end of which is rigidly connected to the lower surface of the diaphragm 25 substantially at its center.

The lower member 8 of the casing 5 is provided with a depending extension or boss 40, which is provided with a stuffing box 41 through which passes a rod or shaft 42 having a squared end 43, and which carries a socket member 44, provided with a threaded socket, 45, adapted to be engaged by the threaded extension 46, of the lever supporting member 47 to which the said lever 33 is pivotally secured as at 48. The said boss 40 is so positioned that the pivot point 48 about which the lever 33 oscillates is closer to the pivot connection 31 than it is to the pivot connection 36, as is clearly shown in Fig. 1.

The lower member 8 of the casing 5 is further provided with a boss 50 which is bored to receive a coiled spring 51, which normally tends to return the lever 33 and the diaphragm 25 to the positions illustrated in Fig. 1. A similar spring 52 may surround the valve stem 13, and engage the head 19 to assist in returning the diaphragm 20 to its position illustrated in Fig. 1. The plate 8 may be provided with the threaded opening, 53, adapted to be normally closed by a threaded plug, not shown, whereby access may be had to the interior of the chamber, 34, as will be readily apparent.

The operation of the pressure regulating valve will be clear from the foregoing but it may be briefly summarized as follows: The valve, being connected in the circuit of the refrigerating fluid as indicated by the pipes 12 and 17 and the said fluid being passed therethrough, a portion thereof will pass through the duct or passage 27 into the chambers 18 and 26, thereby exerting a pressure upon the upper surface of the diaphragm 20. Another portion of the said fluid will pass from the chamber 18, through the duct or passage 29 to the chamber 28, where it will likewise exert a pressure upon the upper surface of the diaphragm 25.

These two pressures will in effect act against one another due to the connections between the two diaphragms 20 and 25, the said connections comprising the links 30 and 37 and the lever 33. It will be noted that the cross-sectional area of the chamber 28 is greater than that of the chamber 26, whereby the total effective area of the diaphragm 25 is greater than that of the diaphragm 20. This would, of course, cause an unbalanced condition, which is increased due to the fact that the arm 35 of the lever 33 is longer than the arm 32 thereof, but the springs 51 and 52 are positioned in such a manner as to act in conjunction with the diaphragm 20 against the diaphragm 25 to produce a balance. In other words the effective area of the diaphragm 25 is so designed that for a predetermined pressure in the circuit of the refrigerating fluid, the said diaphragm 25 will exert a force sufficient to counterbalance that exerted by the diaphragm 20 and also by the springs 51 and 52. It thus results that the needle valve 14, will be maintained in a certain predetermined position so long as the pressure of the refrigerating fluid within the pipes 12 and 17 remains constant, at say 150 pounds to the square inch.

However, should this pressure increase, for example, the increase will be, of course, transmitted through the passages 27 and 29 to the chambers 26 and 28.

Due to the difference in the effective areas of the said diaphragms, however, the total increase of effective pressure upon the upper surface of the diaphragm 25 will be greater than that upon the diaphragm 20. This together with the leverage obtained by the construction of the lever 33 as shown, will result in a partial closing of the needle valve, 14, against the pressure exerted by the gas upon said diaphragm 20 and also against the force exerted by the springs 51 and 52, thereby cutting down the flow of gas passing through the pipe 12, around the needle valve 14, and into the pipe 17.

On the other hand as the pressure within the pipe 12 decreases, such decrease will likewise be transmitted to the pressure chambers 26 and 28 and through the diaphragms 20 and 25 and their lever connections, the needle valve 14 will be further opened. It thus results that the pressure of gas in the pipe 17 will be maintained substantially constant and furthermore the operation will be entirely automatic.

In order to accurately set the needle valve 14 to its predetermined position a wrench may be applied to the squared end 43 of the stem 42 and the latter turned. This turning action through the threaded connection 45 and 46 with the lever support 47 will raise or lower the pivot point 48 of the said lever and consequently the valve as well as the diaphragms 20 and 25, may be adjusted to any desired points.

It will thus be seen that this invention provides a valve for controlling the pressure of a refrigerating fluid within the refrigerating circuit which action is entirely automatic and after the valve is once set for the predetermined pressure no further attention is required in order for it to maintain that pressure in the refrigerating apparatus. Furthermore this invention provides a valve in which the ammonia gas or other refrigerating fluid may be entirely confined within the valve casing in such a manner that there is no chance of its getting in contact with the stuffing box of adjacent mechanisms with its consequent corrosive action and leakage.

It is obvious that those skilled in the art may vary the details of construction as well as the arrangement of parts without departing from the spirit of the invention and therefore it is not wished to be limited to the above disclosure except as may be required by the claims.

What is claimed is:

1. A device of the class described comprising a casing having an inlet and an outlet fluid passage, a pair of pressure chambers, and by-passes connecting said outlet passage with said chambers; a diaphragm in each of said chambers; a valve carried by one of said diaphragms, for controlling said fluid passages; a spring associated with said diaphragm within said casing, normally tending to open said valve; connections between said diaphragms whereby pressure upon the second diaphragm will act in opposition to the pressure on the first diaphragm and to the force of said spring; and means for varying the force exerted by said spring.

2. A device of the class described comprising a casing having an inlet and an outlet fluid passage, a pair of pressure chambers, and by-passes connecting said outlet passage with said chambers; a diaphragm in each of said chambers; a valve having a stem carried by one of said diaphragms, for controlling said fluid passages; a spring associated with said diaphragm surrounding said valve stem within said casing, normally tending to open said valve; connections between said diaphragms whereby pressure upon the second diaphragm will act in opposition to the pressure on the first diaphragm and to the force of said spring; and means for moving said diaphragm connections transversely thereof for varying the force exerted by said spring.

3. A device of the class described comprising a casing having an inlet and an outlet fluid passage, a pair of pressure chambers, and by-passes connecting said outlet passage with said chambers; a diaphragm in each of said chambers; a valve carried by one of said diaphragms, for controlling said passages; a lever within said casing connecting said diaphragms, whereby pressure upon the other of said diaphragms will act in opposition to pressure on said first diaphragm and tend to close said valve; a spring associated with each diaphragm within said casing, tending to open said valve; a fulcrum block for said lever within said casing; and means extending outside said casing for shifting said fulcrum block and lever transversely to vary the force exerted by said springs.

4. A device of the class described comprising a casing having an inlet and an outlet fluid passage, a pair of pressure chambers and by-passes for introducing fluid under pressure from one of said passages to said chambers; a valve controlling said fluid passages; a pair of diaphragms having different effective surface areas mounted within said chambers, one of which is connected to said valve; a lever connecting said diaphragms adapted to cause them to act in opposition to one another, and means for moving said lever transversely to control the movements of said diaphragms and valve.

5. A device of the class described comprising a casing having an inlet and an outlet fluid passage, a pair of pressure chambers and by-passes for introducing fluid under pressure from one of said passages to said chambers; a valve controlling said fluid passages; a pair of diaphragms having different effective surface areas, mounted within said chambers, one of said diaphragms being connected to said valve; a lever connecting said diaphragms adapted to cause them to act in opposition to one another; means for normally compensating for the difference in the total pressures acting upon said diaphragms, due to the difference in their effective surface areas, whereby said valve may be normally maintained in a predetermined position, and means for moving said lever transversely to vary the action of said compensating means.

6. A device of the class described comprising a casing having an inlet and an outlet fluid passage and a pair of pressure chambers; means for introducing fluid under pressure from one of said passages to said chambers; a valve controlling said fluid passages; a pair of diaphragms having different effective surface areas, mounted within said chambers, one of said diaphragms being connected to said valve; lever connections between said diaphragms adapted to cause them to act in opposition to one another; means for adjusting said lever connections transversely whereby the normal position of said valve may be controlled; and springs within said casing for normally compensating for the difference in the total pressures acting upon said diaphragms, due to the difference in their effective surface areas, whereby said valve may be normally maintained in a predetermined position.

In testimony whereof, I affix my signature.

GEORGE F. KNOX.